(12) United States Patent
Ito et al.

(10) Patent No.: US 11,639,443 B2
(45) Date of Patent: May 2, 2023

(54) CARBON BLACK MOLDED BODY AND A METHOD FOR PRODUCING THE SAME

(71) Applicant: KANSAI COKE AND CHEMICALS CO., LTD., Hyogo (JP)

(72) Inventors: Hiroyuki Ito, Hyogo (JP); Takaki Tsukazaki, Hyogo (JP)

(73) Assignee: KANSAI COKE AND CHEMICALS CO., LTD., Hyogo (JP)

( * ) Notice: Subject to any disclaimer, the term of this patent is extended or adjusted under 35 U.S.C. 154(b) by 362 days.

(21) Appl. No.: 16/816,702

(22) Filed: Mar. 12, 2020

(65) Prior Publication Data
US 2020/0299517 A1 Sep. 24, 2020

(30) Foreign Application Priority Data

Mar. 19, 2019 (WO) .................. PCT/JP2019/011437

(51) Int. Cl.
*C09C 1/56* (2006.01)
(52) U.S. Cl.
CPC ............ *C09C 1/56* (2013.01); *C01P 2006/12* (2013.01); *C01P 2006/14* (2013.01); *C01P 2006/16* (2013.01)
(58) Field of Classification Search
CPC ..................................................... C09C 1/56
USPC ......................................................... 428/219
See application file for complete search history.

(56) References Cited

U.S. PATENT DOCUMENTS

| 2006/0258794 A1* | 11/2006 | Gaudet ................ B60C 1/0016 524/496 |
| 2012/0202033 A1* | 8/2012 | Chang .................... H01M 4/14 423/445 R |
| 2015/0321187 A1* | 11/2015 | Dias .......................... C09C 1/48 502/180 |
| 2017/0165641 A1* | 6/2017 | Dias .................... C04B 38/0615 |
| 2018/0345251 A1* | 12/2018 | Dias ...................... B01J 35/023 |
| 2020/0023340 A1* | 1/2020 | Dias ...................... C07C 209/16 |

FOREIGN PATENT DOCUMENTS

| JP | 61-164801 | 7/1986 |
| JP | 7-206415 | 8/1995 |
| JP | 10-140036 | 5/1998 |

(Continued)

OTHER PUBLICATIONS

Office Action dated Jan. 28, 2022 in corresponding Chinese Patent Application No. 202010171878.7, with English-language translation.

(Continued)

*Primary Examiner* — Tahseen Khan
(74) *Attorney, Agent, or Firm* — Wenderoth, Lind & Ponack, L.L.P.

(57) ABSTRACT

The present invention provides a carbon black molded body having different pore structure from conventional carbon black. A carbon black molded body of the present invention includes a peak M of a pore volume being exist in a specified pore diameter in the specified Log differential pore volume distribution; a specified half band width of the peak M; a specified ratio of the half band width/an area-based median diameter; and a specified difference between a maximum value and a minimum value of a Log differential pore volume.

4 Claims, 10 Drawing Sheets

(56) References Cited

FOREIGN PATENT DOCUMENTS

| JP | 2006-342035 | 12/2006 |
| JP | 2017-523024 | 8/2017 |

OTHER PUBLICATIONS

International Preliminary Report on Patentability dated Sep. 16, 2021 in corresponding International (PCT) Patent Application No. PCT/JP2019/011437, with English-language translation.
Office Action dated Aug. 18, 2022 in corresponding Chinese Patent Application No. 202010171878.7, with English language translation.
Office Action dated Jan. 17, 2023, in corresponding Japanese Patent Application No. 2020-037353, with English translation.

* cited by examiner

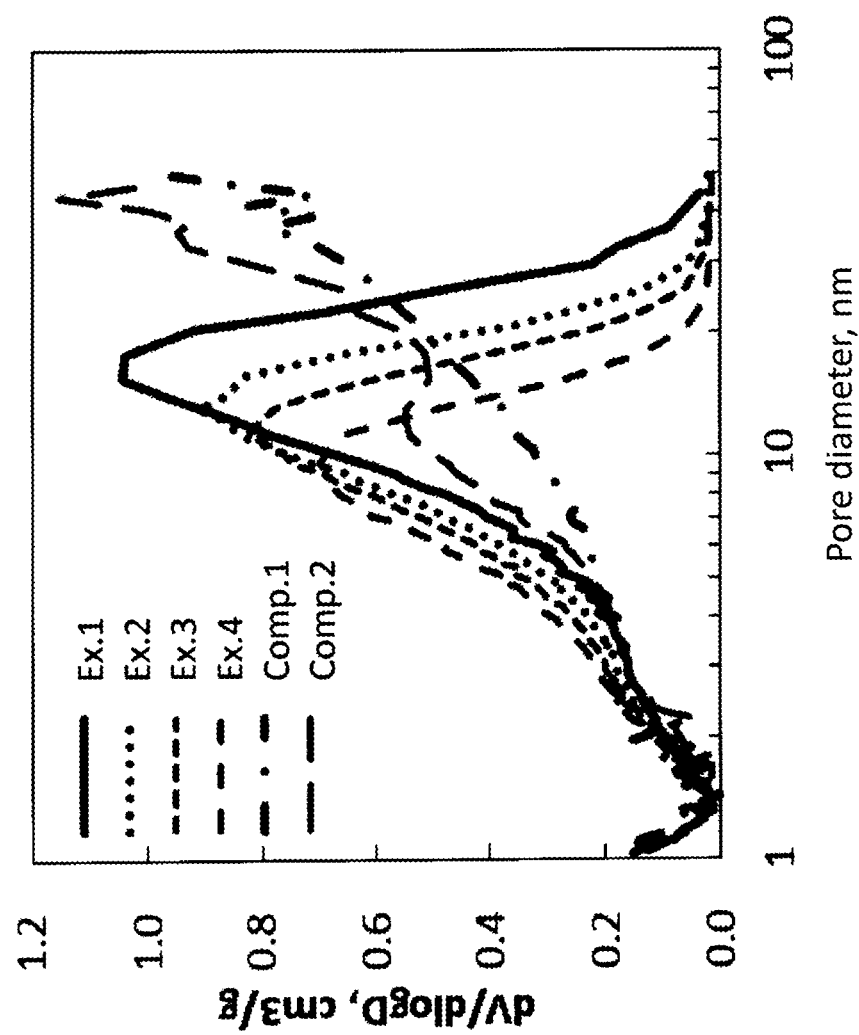
[Fig. 1]

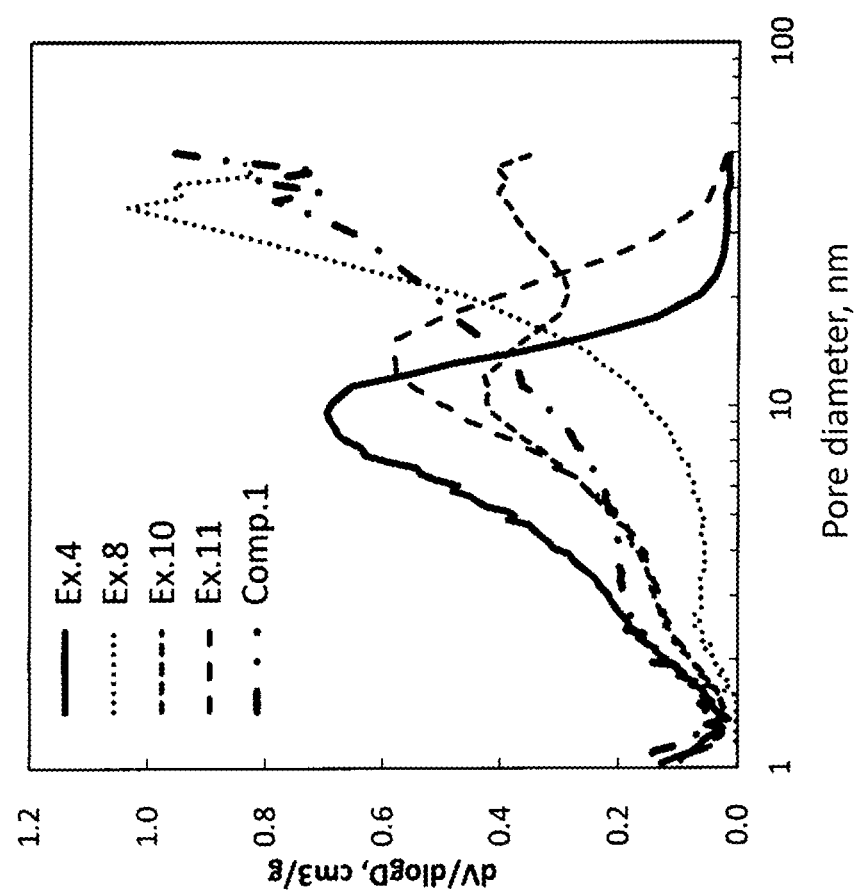
[Fig.2]

[Fig.3]
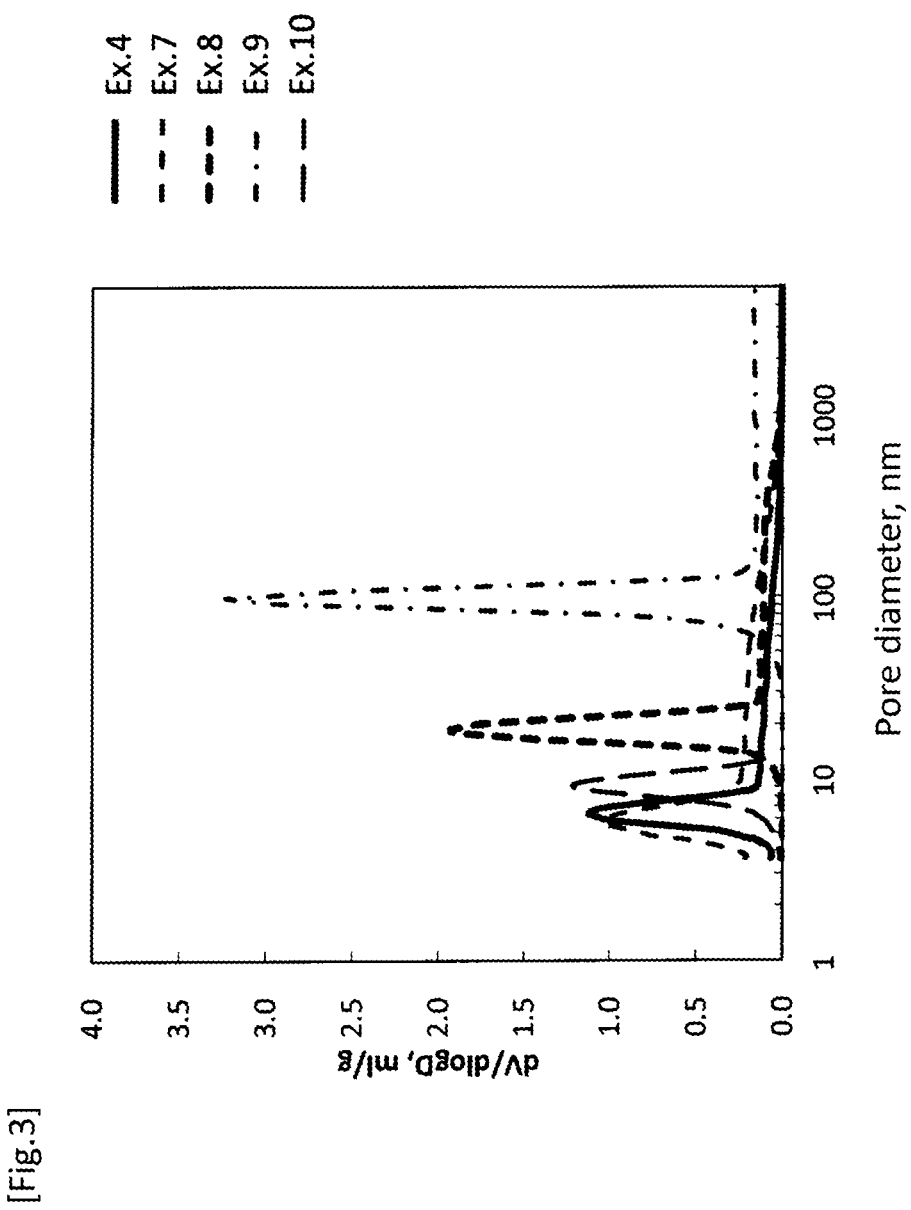

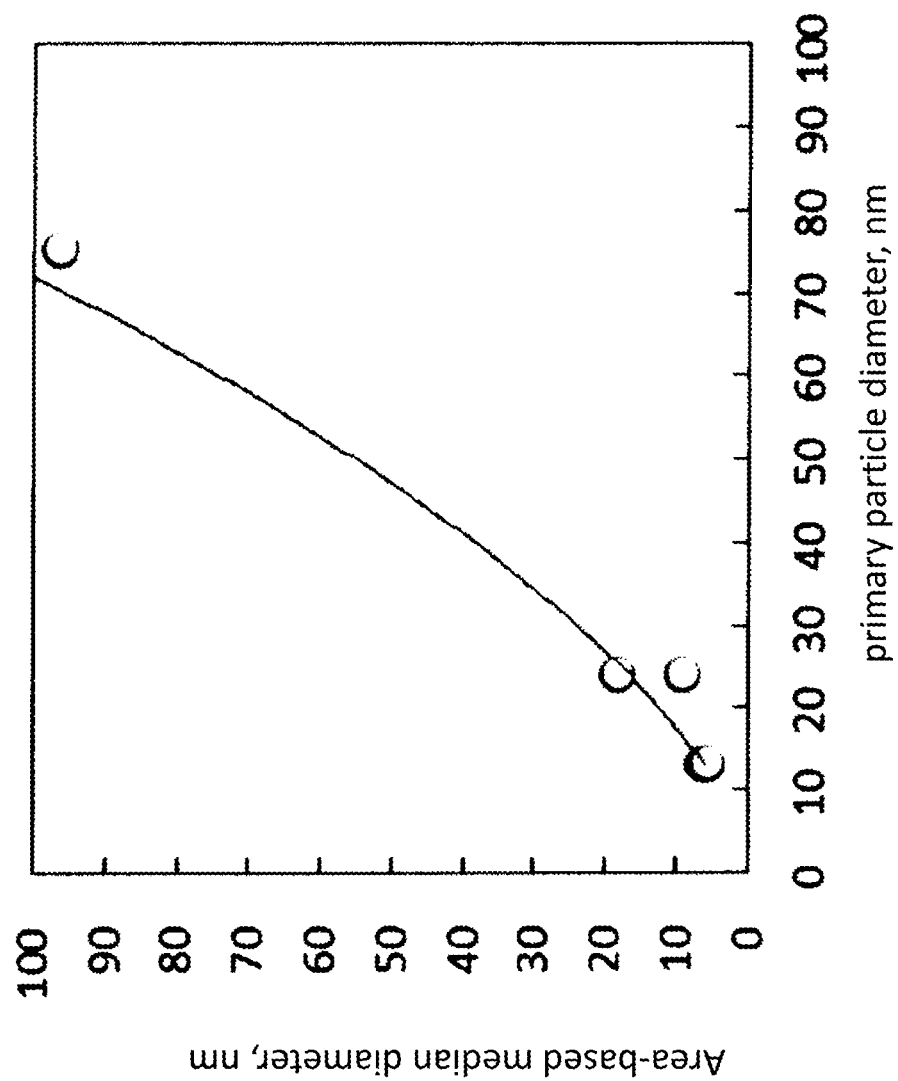
[Fig.4]

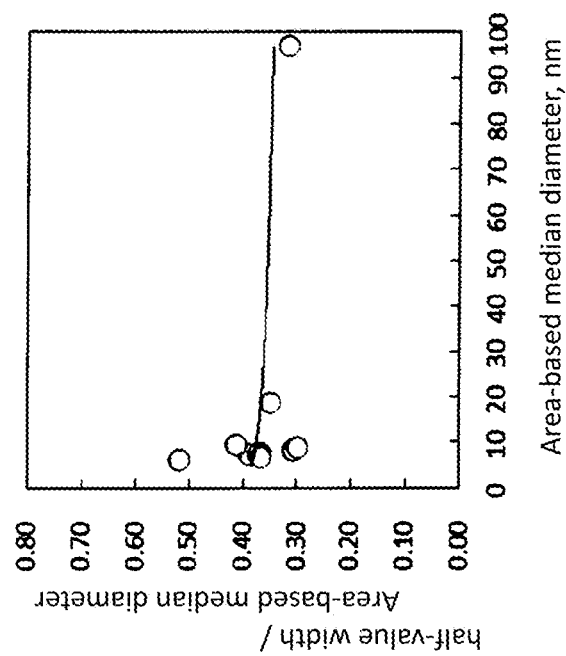
[Fig.5B]
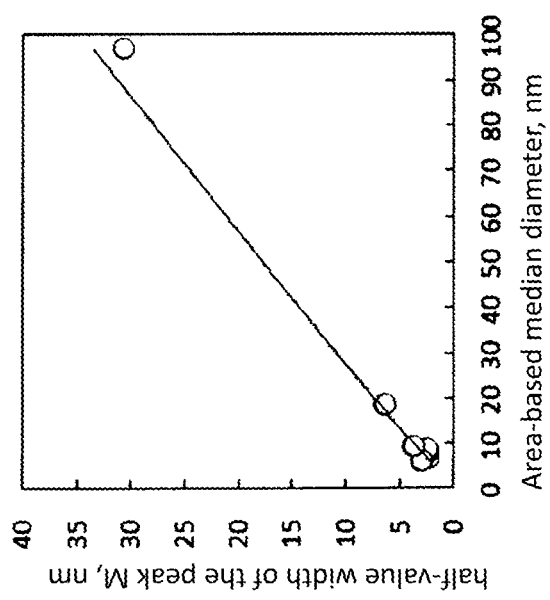
[Fig.5A]

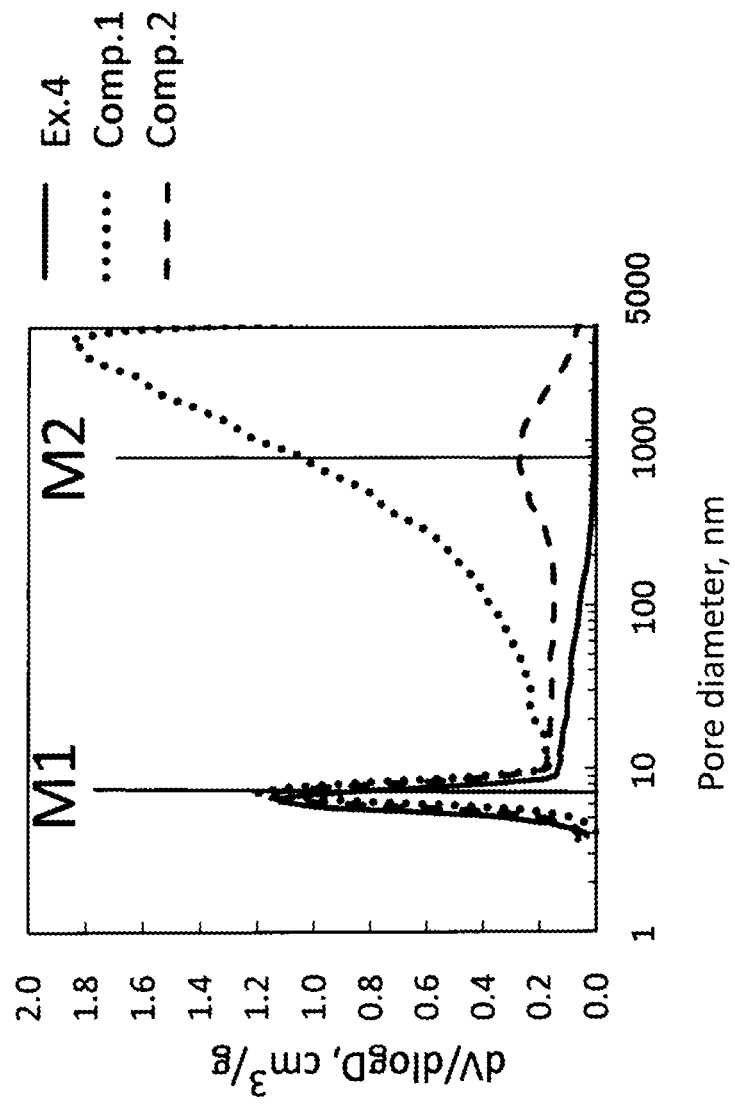
[Fig.6]

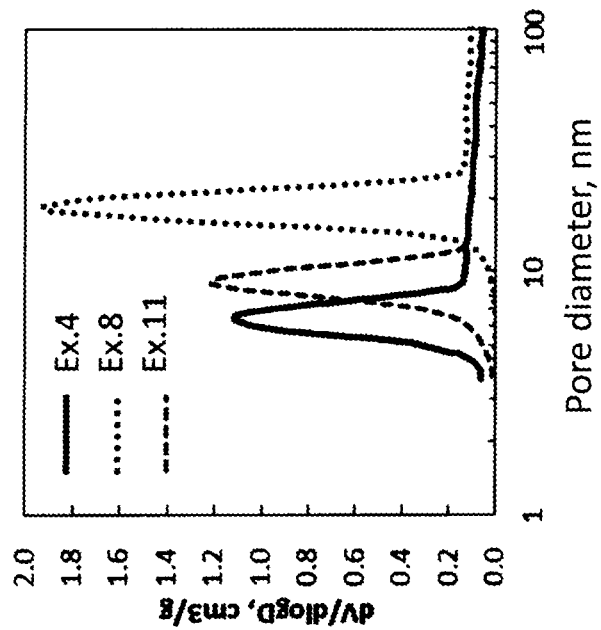
[Fig.7B]
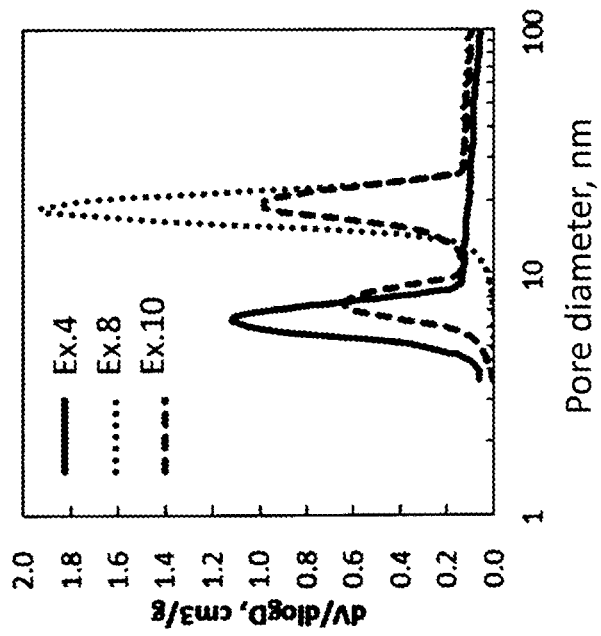
[Fig.7A]

[Fig.8]
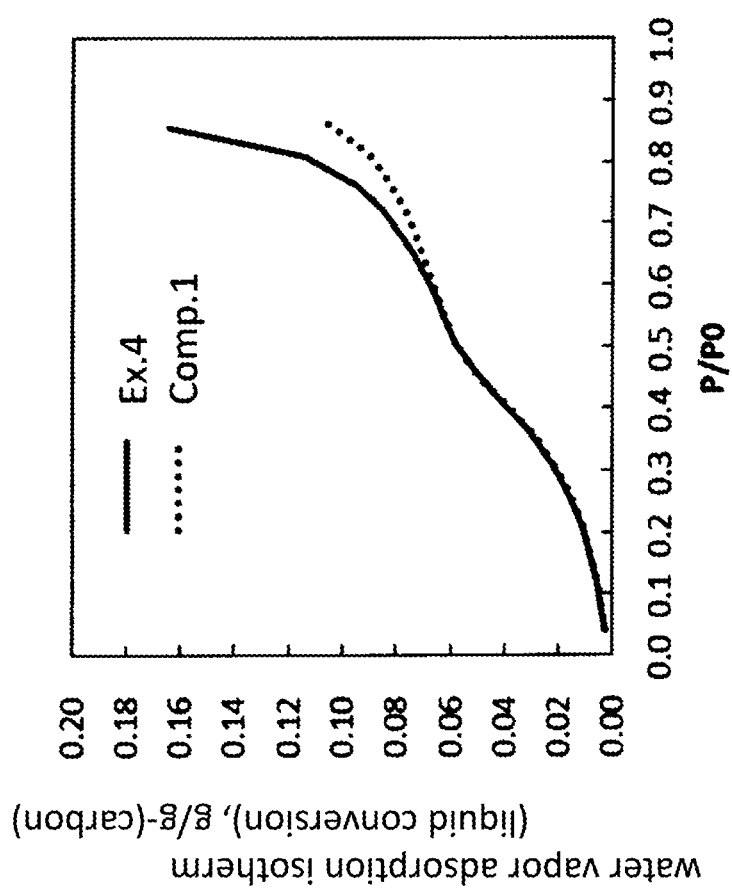

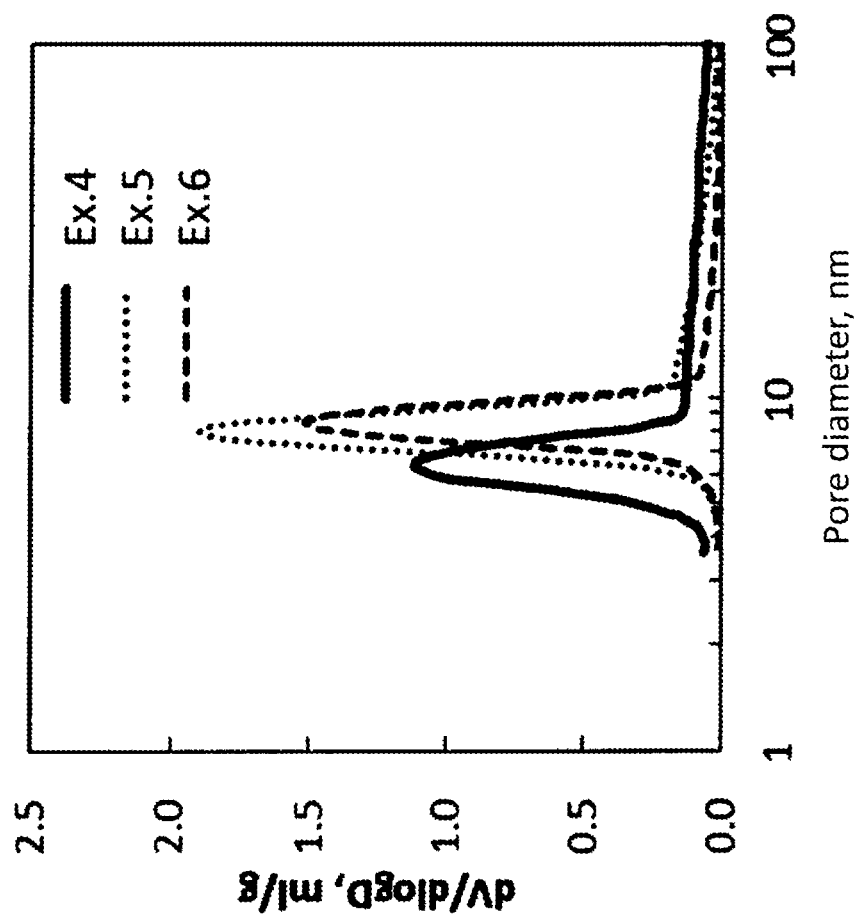
[Fig.9]

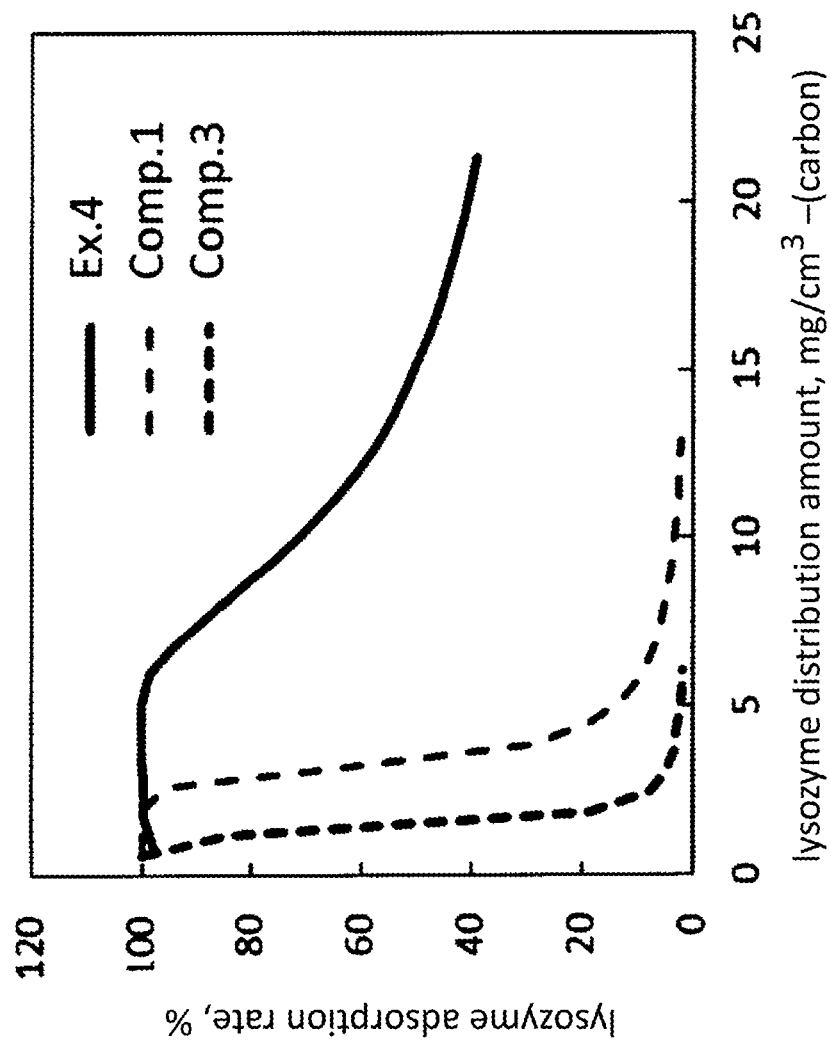
[Fig.10]

CARBON BLACK MOLDED BODY AND A METHOD FOR PRODUCING THE SAME

This application is related to and claims priority under 35 U.S.C. 119 to PCT international application No. PCT/JP2019/011437, filed on Mar. 19, 2019, incorporated herein by reference in its entirety.

TECHNICAL FIELD

The present invention relates to a carbon black molded body and a method for producing the carbon black molded body.

BACKGROUND ART

Carbon black is used in various fields as rubber reinforcing material such as tires, coloring material such as ink and toner, conductive material such as magnetic tape and semiconductor components, and ultraviolet absorbers. Carbon black has poor in handling and transportability due to high dust generation and low bulk density of the carbon black. As a solution for these problems, JPH10-140036A1 as Patent Document 1 proposes to transport carbon black after applying pressure-molding.

New materials using carbon black have been studied in recent years. JP2017-523024A1 as Patent Document 2 proposes as one example, a catalyst carrier using a molded body of mixture of carbon black and binder.

SUMMARY OF THE INVENTION

Technical Problem

An object of the present invention is to provide novel material using carbon black, and more specifically, to provide a carbon black molded body having novel pore structure different from the pore structure of conventional carbon black.

Solution to the Problem

The present invention solving the above problems explains below:

[1] A carbon black molded body including:

a peak M of a pore volume being exist in a pore diameter within a range of from 3.6 nm to 500 nm in a Log differential pore volume distribution;

a half band width of the peak M of 100 nm or less;

a ratio of the half band width/an area-based median diameter of 0.7 or less; and a difference between a maximum value and a minimum value of a Log differential pore volume of 0.18 cm$^3$/g or less in a pore diameter within a range of from 1,000 nm to 5,000 nm in the Log differential pore volume distribution when a pore volume exists in a pore diameter within a range of more than 500 nm;

wherein the Log differential pore volume distribution having a pore diameter (nm) on a horizontal axis and a pore volume (cm$^3$/g) on a vertical axis is obtained by measuring the carbon black molded body in a pore diameter within a range of from 3.6 nm to 5,000 nm of the carbon black molded body by mercury intrusion porosimetry.

[2] The carbon black molded body according to above [1], wherein a number of peaks of the pore volume in the Log differential pore volume distribution in a pore diameter within a range of from 3.6 nm to 500 nm is one peak.

[3] The carbon black molded body according to above [1], wherein the carbon black molded body has a BET specific surface area of from 10 m$^2$/g to 2,000 m$^2$/g.

[4] A method for preparing a carbon black molded body, including: processing a carbon black with an isostatic pressing treatment.

The method for preparing a carbon black molded body according to above [4], wherein the isostatic pressing treatment is conducted after mixing two or more kinds of carbon black.

[6] The method for preparing a carbon black molded body according to above [5], wherein the mixing is a composite treatment in which two or more kinds of the carbon black are pulverized and mixed.

Advantageous Effects of the Invention

The present invention provides a new carbon black molded body having unique pore structure. In particular, the carbon black molded body of the present invention has an adsorption performance for an object to be adsorbed that could not be adsorbed by conventional carbon black because the carbon black molded body of the present invention has different pore structure from pore structure of the conventional carbon black.

BRIEF DESCRIPTION OF THE DRAWINGS

FIG. 1 shows a Log differential pore volume distribution curve obtained by a nitrogen gas adsorption method.

FIG. 2 shows a Log differential pore volume distribution curve obtained by a nitrogen gas adsorption method.

FIG. 3 shows a Log differential pore volume distribution curve obtained by mercury intrusion porosimetry.

FIG. 4 shows a graph plotting the relationship between a primary particle diameter and an area-based median diameter obtained by mercury intrusion porosimetry.

FIGS. 5A and 5B are graphs plotting relationship between an area-based median diameter and a half band width of a pore diameter distribution obtained by mercury intrusion porosimetry.

FIG. 6 shows a Log differential pore volume distribution curve obtained by mercury intrusion porosimetry.

FIG. 7A shows a log differential pore volume distribution curve (mercury intrusion porosimetry) of a carbon black molded body prepared by simple mixing two types of raw materials, and FIG. 7B shows a log differential pore volume distribution curve (mercury intrusion porosimetry) of a carbon black molded body prepared by compounding two types of raw materials.

FIG. 8 shows a steam adsorption isotherm of a carbon black molded body.

FIG. 9 shows a Log differential pore volume distribution curve obtained by measuring the carbon black molded bodies of Examples 4 to 6 by mercury intrusion porosimetry.

FIG. 10 shows a graph plotting the protein separation test results of the examples.

DESCRIPTION OF EMBODIMENTS

Carbon black has complex aggregate structure (primary aggregate) configured by branched irregular chains of spherical fine particles (primary particles) having its size of from several nm to hundreds nm are branched into irregular chains. Further, the several primary aggregate may aggregate to form an agglomerate (secondary aggregate) by van der Waals force or adhesion with each other. Therefore, measurement of pore size distribution of powder state carbon black counts voids between primary particles in a primary aggregate, voids between primary aggregates, voids between secondary aggregates, and other voids as pores. A pore diameter of conventionally known carbon black (unmolded carbon black powder, the same applies hereinafter) shows uneven distribution as shown in the pore volume distribution curve of FIG. 6 (Comp. 1) because these voids are irregularly formed in the carbon black.

The present inventors had studied carbon black to provide more uniform pore size distribution than that of conventional carbon black. The studies lead the inventers to the present invention that isostatic pressing treatment of carbon black makes the carbon black uniformly be consolidated to reshape inter-particle voids uniformly and thus obtained carbon black molded body has more uniform pore size distribution than that of conventional carbon black.

The carbon black molded body of the present invention satisfies following conditions (I) to (IV) in terms of the Log differential pore volume distribution (dV/d log(D)) obtained by measuring the carbon black molded body in a pore diameter within a range of from 3.6 nm to 5,000 nm by mercury intrusion porosimetry in which a pore volume distribution curve is plotted in a Log differential pore volume distribution diagram having pore diameter (diameter: nm) as the horizontal axis and pore volume (cm$^3$/g) as the vertical axis.

(I) A peak M of a pore volume indicated by the pore volume distribution curve exists in a pore diameter within a range of from 3.6 nm to 500 nm.

(II) A half band width of the peak M is 100 nm or less.

(III) A ratio of [the half band width/an area-based median diameter] is 0.7 or less.

(IV) when a pore volume exists in a pore diameter exceeding 500 nm, a difference between a maximum value and a minimum value of a Log differential pore volume of 0.18 cm$^3$/g or less in a pore diameter within a range of from 1.000 nm to 5,000 nm in the Log differential pore volume distribution diagram.

The carbon black molded body of the present invention has unique pore structure. The present invention defines physical properties specified by the mercury intrusion porosimetry as an index for the pore structural characteristics. The above (I) to (III) define physical properties peculiar to the carbon black molded body of the present invention that the peak M appeared in a predetermined range specified by the pore distribution curve is sharp and the carbon black molded body has an uniform pore distribution. The above (IV) is an index mainly for differentiating the carbon black molded body of the present invention from a conventional carbon black molded body. The pore structure of the carbon black molded body obtained by the isostatic pressing treatment as in the present invention is hard to be reconstructed. Conventional carbon black is unpressurized form as it is or molded by uniaxial press molding. Therefore, measuring the conventional carbon black by the mercury intrusion porosimetry reconstructs pore structure by pressure of mercury intrusion which results in changing the pore structure of the carbon black molded body before and after the measurement. That is, the conventional unpressurized or the uniaxial pressed carbon black molded body before the measurement has different pore structure from the carbon black molded body of the present invention in that a peak top position does not overlap with each other as shown in FIG. 1 (Comps. 1 and 2). However, the measurement of the conventional carbon black by mercury intrusion porosimetry changes its peak top position as shown in FIG. 6 which may satisfy above (I) to (III). The present invention defines above (IV) as a further index for distinguishing the carbon black molded body of the invention from a conventional carbon black molded body which changes the pore structure by pressure during the measurement. Detail reasons are explained below.

Mercury intrusion porosimetry intrudes mercury into voids between carbon black particles when measuring carbon black. During the measurement, mercury intrusion reconstructs the voids of non-consolidated material (Comp.1) such as conventional unpressurized carbon black to indicate nearly the same pore volume distribution curve having a peak M1 with generally the same distribution as the carbon black molded body of the present invention (Ex.4) as shown in FIG. 6. As mentioned above, the measurement of the conventional carbon black by the mercury intrusion porosimetry applies the same pressure to the voids by mercury intrusion as the pressure of the isostatic pressing treatment. Therefore, distinguishment between the carbon black molded body of the invention and the conventional carbon black may be difficult based only on the peak in the distribution curve. However, the conventional carbon black has numbers of voids having a relatively large pore diameter. For example, numbers of voids exist in a pore diameter of larger than the pore diameter of the distribution peak top. Therefore, the pore volume distribution curve of the conventional carbon black tends to have extremely enlarged vertical axis value in the pore diameter larger than the pore diameter of the distribution peak compared with a vertical axis value in the pore diameter smaller than the pore diameter of the distribution peak value. On the other hand, the carbon black molded body of the present invention tends to have decreased vertical axis value of a pore diameter as a pore diameter becomes larger than the pore diameter of the distribution peak because the carbon black molded body of the present invention has more uniformly formed pore diameter than that of the conventional carbon black molded body.

FIG. 6 shows the same tendency of the pore volume distribution curve (Comp. 2 in FIG. 6) of the carbon black molded body obtained by the uniaxial pressing (hereinafter referred to as uniaxial pressed carbon black molded body) as that of the conventional carbon black. That is, the uniaxial pressing applies pressure to the carbon black only from one direction and yields uneven pores having various diameters due to insufficient pressure from the other direction. Therefore, by applying the mercury intrusion porosimetry to the uniaxial pressed carbon black molded body having the pore volume distribution curve as shown in FIG. 1 (Comp.2), which is measured by the nitrogen gas adsorption method, the pores are consolidated by mercury intrusion as same as the pores consolidated by the isostatic pressing treatment. Thus obtained uniaxial pressed carbon black molded body shows nearly the same pore volume distribution curve having a peak M1 as the pore volume distribution curve of the carbon black molded body of the present invention as shown in FIG. 6. Whereas, FIG. 6 confirms that the uniaxial pressed carbon black molded body shows a pore volume distribution curve with many voids (pores) on the larger pore diameter side than the pore diameter of the distribution peak M1 (for example, near the peak M2). Accordingly, the present invention defines above (IV) as an index for distinguishing the carbon black molded body of the invention from a conventional carbon black molded body by considering the above mentioned changes influenced by the mercury intrusion porosimetry.

Followings explain the above indexes (I) to (IV).

(I) Peak M: The Peak M Exists in a Pore Diameter within a Range of from 3.6 nm to 500 nm The "peak" in the present invention means the maximum value of pore volume on a pore volume distribution curve of the Log differential pore volume distribution. The carbon black molded body of the present invention has a distribution peak M in a pore diameter of from 3.6 nm to 500 nm. The peak position of the distribution curve on the horizontal axis may be adjusted according to a method for preparing the carbon black molded body described later. Accordingly, the distribution peak position may be adjusted according to its application, and the distribution peak may exist in either the mesopore region (2 nm to 50 nm) or the macropore region (over 50 nm to 500 nm). Considering the selectivity for adsorbate, the position of the peak M is preferably in a pore diameter of 400 nm or less, more preferably 300 nm or less, still more preferably 250 nm or less, further more preferably 100 nm or less, 80 nm or less, 60 nm or less, 40 nm or less, and 20 nm or less in this preferable order.

(II) Half Band Width of the Peak M: 100 nm or Less

The half band width of the peak M is from 1 nm to 100 nm or less. As the half band width becomes narrower, the pore diameter becomes more uniform. This means pores having a desired pore diameter are formed more accurately. In addition, as the half band width becomes narrower, for example, the adsorption property for adsorbate suitable for the desired pore diameter is improved more. The half band width of the distribution peak is preferably 100 nm or less, 50 nm or less, 40 nm or less, 30 nm, 20 nm or less, and 10 nm in this order.

(III) A Ratio of [Half Band Width/Area-Based Median Diameter]: 0.7 or Less

The carbon black molded body of the present invention has a sharper peak and more uniform pore size distribution compared with that of a conventional carbon black molded body because the carbon black molded body of the present invention is subjected to the isotropic pressure treatment. The present invention defines the relationship between the half band width and the area-based median diameter as a ratio of "half band width/area-based median diameter" as the index for the sharpness and uniformity of the pore diameter distribution. The ratio of half band width/area-based median diameter is 0.7 or less, preferably 0.6 or less, more preferably 0.5 or less, and preferably 0.1 or more. The half band width uses the half band width of the peak M (nm). The area-based median diameter uses a value (nm) of the carbon black molded body measured by the mercury intrusion porosimetry.

The area-based median diameter of the present invention means a value obtained by measuring and calculating the pore diameter of the carbon black molded body by the mercury intrusion porosimetry, and the detail conditions of the measurement are based on the examples of the present invention. If the area-based median diameter takes extremely small value, the adsorption speed may be decreased. If the area-based median diameter takes extremely large value, the carbon black molded body may be bulky. Accordingly, the area-based median diameter is preferably 500 nm or less, more preferably 250 nm or less, and still more preferably 100 nm or less.

(IV) The Difference Between the Maximum Value and the Minimum Value of the Log Differential Pore Volume in a Pore Diameter within a Range of from 1,000 nm to 5,000 nm when a Pore Volume Exists in a Pore Diameter within a Range of More than 500 nm: 0.18 $cm^3/g$ or Less The carbon black molded body of the present invention having more uniform pore diameter than that of the conventional carbon black molded body shows a tendency of decreased amount of large pore diameters as a pore diameter becomes larger than the pore diameter at the distribution peak top. On the other hand, conventional carbon black or uniaxial pressed carbon black molded body have large difference between the maximum value and the minimum value of the Log differential pore volume in a pore diameter within a range of from 1,000 nm to 5,000 nm as shown in FIG. 6. Based on the Log differential pore volume distribution in the present invention, when the pore volume exists in a pore diameter within a range of more than 500 nm, the difference between the maximum value and the minimum value of the Log differential pore volume in a pore diameter within a range of from 1,000 nm to 5,000 nm is 0.18 $cm^3/g$ or less, preferably 0.1 $cm^3/g$ or less, more preferably 0.05 $cm^3/g$ or less. The lower limit of the difference is not particularly limited, and may be 0 $cm^3/g$.

The carbon black molded body of the present invention has physical properties satisfying the above (I) to (IV), and may satisfies at least one of the following (V) to (VIII) as a preferred embodiment.

(V) A Number of Peaks of the Pore Volume in the Log Differential Pore Volume Distribution in a Pore Diameter within a Range of from 3.6 nm to 500 nm: One Peak The carbon black molded body of the present invention may have one peak or two or more of peaks having locally maximum value in addition to the distribution peak M. In the present invention, the peak maybe described as peak M1 showing the maximum value in the Log differential pore volume distribution, and as decreasing peak value, the next maximum peak may be described as peak M2 and sequentially described as peak M3 based on the peak value. For improving adsorption performance and adsorption amount for adsorbate having predetermined size, preferable number of distribution peak counted in a pore diameter within a range of from 3.6 nm to 500 nm is one peak.

(VI) BET Specific Surface Area

The carbon black molded body preferably has a BET specific surface area of 10 $m^2/g$ to 2,000 $m^2/g$. The BET specific surface area is more preferably 25 $m^2/g$ or more, further preferably 100 $m^2/g$ or more, and even more preferably 200 $m^2/g$ or more because larger specific surface area improves the adsorption performance. The BET specific surface area is more preferably 1,500 $m^2/g$ or lower, further preferably 1,200 $m^2/g$ or lower, and even more preferably 1,000 $m^2/g$ or lower because extremely large BET specific surface area may decrease the density of the carbon black molded body and may result in lowering the particle strength of the carbon black molded body. The BET specific surface area of the carbon black molded body is measured by a nitrogen adsorption isotherm with a BET method.

(VII) Pore Volume in a Pore Diameter within a Range of from 3.6 nm to 5,000 nm

Increasing the pore volume in a pore diameter of from 3.6 nm to 5,000 nm of the carbon black molded body may improves the initial adsorption rate. However, increasing the pore volume in the above range tends to decrease the specific surface area. The pore volume in a pore diameter of from 3.6 to 5,000 nm measured by the Mercury intrusion porosimetry is preferably 0.05 $cm^3/g$ or more, more preferably 0.1 $cm^3/g$ or more, and still more preferably 0.2 cm³/g or more and preferably 2.0 cm³/g or less, more preferably, 1.5 cm³/g or less, still more preferably 1.0 cm³/g or less.

(VIII) Amount of Acidic Surface Functional Groups, Amount of Basic Surface Functional Groups The carbon black molded body of the present invention may adjust its hydrophilicity and its adsorption performance by appropriately adjusting the amount of acidic surface functional groups and/or the amount of basic surface functional groups. For example, the amount of acidic surface functional groups may be adjusted to 5 meq/g or less. And for example, the amount of basic surface functional group may be adjusted to 5 meq/g or less. The amount of acidic surface functional groups and the amount of basic surface functional groups are values based on the measurement methods described in the examples.

The size of the carbon black molded body is not particularly limited, and can be appropriately selected depending on its application. Further, the shape of the carbon black molded body is not particularly limited to a specific shape.

A preferred method for producing the carbon black molded body of the present invention is described below.

Carbon Black

The carbon black used as a raw material can be appropriately selected from the group consisting of furnace black, acetylene black, lamp black, thermal black, channel black, roller black, disk black, and other known carbon blacks. These examples can be used alone or in any combination. The present invention may accept various commercially available carbon blacks as a raw material. The method for producing carbon black is not particularly limited, and any carbon black obtained by various known production methods can be used in the present invention.

The present invention permits to use commercially available carbon black as it is, therefore the carbon black has no limitation of a primary particle diameter, an average particle diameter, and specific surface area. The larger primary particle size of the carbon black increases the size of the interparticle voids. Therefore, the present invention allows to appropriately select a primary particle size to obtain a desired pore size. The carbon black may be in any state of primary particles, primary aggregates, and secondary aggregates. The carbon black may be crushed and classified to obtain a desired state if necessary.

The carbon black molded body of the present invention has pores formed by voids between the carbon black particles. The carbon black molded body of the present invention has large adsorption capacity and capable of adsorbing large adsorbates because the pores formed by the interparticle voids have a larger pore size and larger pore volume than that of the unmolded carbon black.

In the present invention, the carbon black is molded by the isostatic pressing treatment. The carbon black may be molded by the isostatic pressing treatment after pretreating the carbon black. Examples of the pretreatment include (I-1) activation treatment, (I-2) mixing treatment or composite treatment, and (I-3) oxidation treatment. These pretreatments may be performed alone or in combination.

(I-1) Activation Treatment

The carbon black may be processed by the activation treatment. The activation treatment of the carbon black may change pore structure and specific surface area of the carbon black to form carbon black pore structure suitable for adsorbate. Therefore, using the activated carbon black as a raw material improves the adsorption performance for a specific adsorbate. Any know activation treatment such as steam activation and alkali activation are applied as the activation treatment.

(I-2) Mixing Treatment or Composite Treatment

The present invention allows to use several kinds of carbon black. The several kinds of carbon black may be processed by simple mixing treatment, or composite treatment as described later. The simple mixing treatment means that several kinds of carbon black is put in the same container and then stirred and mixed while adding water or other additive appropriately. Therefore, simple mixing treatment hardly clashes the carbon black particles or pulverizes agglomerates of the carbon black particles. The simple mixing treatment of the carbon black may not change the composition of the agglomerates. Therefore, processing thus obtained carbon black by the isostatic pressing treatment yields carbon black molded body having a distribution peak of each carbon black used as a raw material as shown in FIG. 7A (Ex.10).

The composite treatment mixes several kinds of carbon black having different particle diameters and pulverize primary aggregates and secondary aggregates into primary particles level to reconstitute aggregates. The composite treatment mixes several kinds of carbon black at primary particle level by pulverizing aggregates or large aggregates of the carbon black. Therefore, the aggregates of the carbon black obtained by the composite treatment (herein after may be called composite carbon black) has different aggregate structure from the aggregate structure of the carbon black mixture obtained by the simple mixing treatment because the aggregate structure of the composite carbon black is reconstituted in combination with primary particles having different particle sizes. After the composite treatment, processing thus obtained carbon black by the isotropic pressing treatment yields more uniformly formed voids, and thus obtained carbon black molded body has a new distribution peak different from the peak of the above carbon black molded body obtained from the simple mixing treated carbon black as shown in FIG. 7B (Ex.11). For example, adjustment of mixing ratio of several kings of raw material carbon black having different particle size distribution peaks allows to control distribution peak positions of the carbon black molded body by conducing the composite treatment. The composite treatment uses preferably mechanical stirring and mixing means such as a ball medium mill (such as a vibrating ball mill, a planetary ball mill), a jet mill, a wet jet mill, a wet high-speed rotary mill (such as a colloid mill), a medium stirring mill (such as a stirred tank type bead mill, a flow tube type mill). The composite treatment may be either a wet type process or a dry type process.

(I-3) Oxidation Treatment

The carbon black may be processed by oxidation treatment in the present invention. The oxidation treatment changes the amount of functional groups on the surface of the carbon black and thereby changes the properties such as adsorption and hydrophobicity of the carbon black molded body. The oxidation treatment increases the amount of acidic functional groups of the carbon black and decreases the amount of basic functional groups. Also, the oxidation treatment of the carbon black improves hydrophilicity by changing the amount of surface functional groups. Therefore, processing the oxidized carbon black by the isostatic pressing treatment yields the carbon black molded body having improved hydrophilicity and improved adsorption to polar molecules.

Oxidation treatment may be either wet oxidation treatment or dry oxidation treatment. As the dry oxidation treatment, for example, the carbon black may be supplied with oxidizing gas such as air or ozone into a furnace heated to in the range of about 200° C. to 400° C. As the wet oxidation treatment, for example, the carbon black and an oxidant containing solution such as inorganic acids and/or organic acids may be stirred under in the range of 50° C. to 120° C. for 5 hours to 15 hours, followed by washing and drying. The amount of acidic functional groups of the carbon black can be controlled by appropriately adjusting the treatment time, treatment temperature, and other conditions.

Isostatic Pressing Treatment

The present invention molds above carbon black by isostatic pressing treatment. The isotropic pressing treatment applies pressure equally to a carbon black surface for pressure molding without directions. Examples of the isostatic pressing treatment includes cold isostatic pressing treatment (CIP: Cold Isostatic Pressing), hydrostatic pressuring treatment, rubber pressing treatment, and hot isostatic pressing (HIP: HOT Isostatic Pressing). The cold isostatic pressing treatment (CIP) is preferable among examples because the cold isostatic pressing treatment (CIP) applies a three-dimensionally uniform pressure to a substance under a room temperature. The cold isostatic pressing treatment may be either wet treatment or dry treatment. Any known pressurizing medium such as gas or liquid may be used in the present invention.

The carbon black molded body consolidated by the isostatic pressuring treatment without using a binder has enough strength to maintain its desired shape. Carbon black molded body obtained by applying the isostatic pressing treatment to the carbon black with binders reduces significantly pore volume and specific surface area of thus obtained carbon black molded body. The present invention preferably adds no binder to the carbon black when conducting the isostatic pressing treatment. Therefore, the amount of binder contained in the carbon black molded body is preferably 20% by mass or less, more preferably 10% by mass or less, and still more preferably 0% by mass.

As the treatment pressure of the isostatic pressing treatment is increased, the inter-particle voids decreases its void size, and the pore diameter to be formed tends to be decreased. Further, when the treatment pressure is increased, the shape of the pore volume distribution curve also becomes sharper with the distribution peak at the center of the curve, that is, the pore diameter is easily uniformized. Accordingly, the treatment pressure of the isostatic pressing treatment is preferably 20 MPa or more, more preferably 50 MPa or more, still more preferably 100 MPa or more, and even more preferably 200 MPa or more. When the treatment pressure is too high, the voids to be formed tend to be decreased. Therefore, the pressure is preferably 500 MPa or less, more preferably 400 MPa or less, still more preferably 300 MPa or less, and even more preferably 250 MPa or less. The pressure holding time of the treatment is preferably 1 minute or longer, more preferably 5 minutes or longer. A longer pressure holding time saturates the above effects, and therefore, the pressure holding time is preferably 60 minutes or shorter, more preferably 30 minutes or shorter.

The isotropic pressing treatment improves the strength of the carbon black molded body and thereby the carbon black molded body suppresses destruction of its form by friction during its handling or its use. Therefore, the carbon black molded body of the present invention achieves higher packing density to increase the adsorption efficiency.

A post-treatment may be applied to the carbon black molded body obtained by the above isostatic pressing treatment. Examples of the post-treatment include (II-1) secondary molding treatment and (II-2) heat treatment. One or combination of these post-treatments may be performed after the isostatic pressing treatment. The application order of the post-treatment combination is not particularly limited. In addition, the pre-treatment and the post-treatment may be performed in any combination.

(II-1) Secondary Molding Treatment

The carbon black molded body may be used as an adsorbent such as an adsorption filter as it is, crushed into a desired size or formed into desired shape to be used as an adsorbent. The present invention includes any secondary molded body having same distribution peak as the carbon black molded body. The carbon black molded body may take any shape according to its application. The carbon black molded body may be formed into a secondary molded body to have desired shape such as pellet shape, plate shape, briquette shape, or sphere shape according to its application.

(II-2) Heat Treatment

Heat treatment may apply to the carbon black molded body. The heat treatment may change various properties of the carbon black molded body such as crystallinity, oxidation resistance, surface functional group content, and hydrophobicity. An increase in the heat treatment temperature progresses carbon black crystallization yielding an oxidation resistance improvement. Also, an increase in the heat treatment temperature reduces the amount of acidic functional groups and increases the amount of basic functional groups. An adjustment of the amount of surface functional groups such as the ratio of the acidic functional group amount to the basic functional group amount changes the hydrophobicity and kinds of adsorbates.

An application of the heat treatment to the carbon black molded body expands inter-particle voids size concurrently occurred with thermal shrinkage of the carbon black particles which tend to increase the pore diameter and decrease the specific surface area. Accordingly, applying higher heat treatment temperature tends to shift the position of the distribution peak to a direction in larger pore diameter side on the horizontal axis. An increase in the heat treatment temperature may not change drastically the half band width of the distribution peak. A change of the half band width may be suppressed within plus 2 nm after the heat treatment compared to that of before the heat treatment. Therefore, the carbon black molded body of the present invention maintains the characteristic pore structure having a uniform and sharp pore distribution.

The heat treatment temperature may be appropriately set according to the desired characteristics described above. As examples, an increase in the heat treatment temperature reduces the amount of acidic functional groups. As specific examples, the heat treatment temperature of 1200° C. or more removes functional groups to non-detected level. Also, an increase in the heat treatment temperature increases degree of crystallization of the carbon black. Therefore, the preferred heat treatment temperature is less than graphitization temperature of the carbon black.

The carbon black molded body of the present invention has novel pore structure which is unavailable in conventional carbon black. And adjustment of the pore structure allows the carbon black molded body to apply for various applications. The carbon black molded body of the present invention is usable for an adsorbent as for example because the inter-particle void functions as a pore having adsorption performance. Examples of the adsorbent includes various application such as used for liquid phase treatment such as water purification treatment, wastewater treatment, and precious metal recovery treatment; air purification treatment, deodorization treatment, gas separation treatment; solvent collection treatment; and exhaust gas treatment. In addition, the carbon black molded body of the present invention is capable of adsorbing a substance having a size that is impossible to be adsorbed by conventional carbon black. And the carbon black molded body of the invention is applicable in medical use as an adsorbent for various proteins, riboproteins, viruses, macroparticles, lysozyme, and the like.

EXAMPLES

The present invention will be more specifically described below, by way of examples. However, the present invention is not limited by the following examples. It is naturally understood that modifications may be properly made and practiced within the scope adaptable to the gists described above and below. All of these are included in the technical scope of the present invention.

Raw Material

Molded bodies were prepared under the following conditions using the raw material Nos. 1 to 5. The raw material Nos. 1 to 4 were carbon black and the raw material No. 5 was activated carbon.

Cold Isostatic Pressing Treatment (CIP)

In Examples 1 to 11, the raw material was processed by CIP treatment. Specifically, after 3 g of the raw material was filled in a polyethylene bag and sealed, the sealed bag was loaded into a hydrostatic press powder forming apparatus (manufactured by Nippon R & D Industries). After operating the apparatus to increase the pressure to the predetermined pressure shown in Table 2, the CIP treatment was applied in which the pressure was maintained for the predetermined time shown in Table 2 and then obtained a sample.

Heat Treatment at 1200° C.

In Example 5, heat treatment was further performed in a lifting furnace after the CIP treatment. Specifically, after the CIP treatment, about 3 g of the obtained molded body was charged into a porcelain crucible, and then the temperature was increased to 1200° C. at a rate of 4.2° C./min while flowing nitrogen at 2 L/min and then maintained the temperature for 2 hours to perform heat treatment to obtain a sample.

Heat Treatment at 2400° C.

In Example 6, heat treatment was further performed in a graphitization furnace (Kurata Giken Co., Ltd.). Specifically, after the CIP treatment, about 3 g of the obtained molded body was charged into a porcelain crucible, and then the temperature was increased to 2400° C. at a rate of 10° C./min under argon atmosphere and then maintained the temperature for 2 hours to perform heat treatment to obtain a sample.

Example 10

Simple Mixing Treatment—CIP Processing

In this example, 5 g of the raw material 1, 5 g of the raw material 2 and 100 g of pure water were put in a glass container, and wet-mixing with a stirrer (Three One Motor manufactured by Shinto Kagaku Co., Ltd.) equipped with a stainless steel stirring blade was conducted by rotating the stirring blade at 500 rpm for 30 minutes at room temperature. Thus obtained suspension was dried overnight (holding temperature: 115° C.) in a box type dryer at 115° C., and then subjected to the CIP treatment under the same conditions as in Example 9 to obtain a sample.

Example 11

Composite Treatment—CIP Treatment

In this example, 5 g of the raw the material 1, 5 g of the raw material the 2, 250 g of zirconia balls ($\varphi_3$ mm) and 100 g of pure water were put into a pot (250 mL) for a planetary ball mill, and then wet pulverized for 30 minutes. Thus obtained suspension was dried overnight (holding temperature: 115° C.) with a box type dryer at 115° C., and then subjected to the CIP treatment under the same conditions as in Example 9 to obtain a sample.

In Comparative Examples 1 and 3, the raw material as it is was used as a sample without any pressure treatment or other treatment.

Comparative Example 2

Uniaxial Press Treatment

In this example, 3 g of the raw material was packed in a mold for forming a cylinder shape having an inner volume of 24 mm $\varphi$, and was pressurized to 80 kN with a hydraulic hand press, and the pressure was maintained for 3 minutes to perform a uniaxial pressure treatment to obtain a sample.

Properties of each obtained samples were measured by the following measurement methods.

Specific Surface Area

After treating 0.2 g of the sample by vacuum heating at 250° C., a nitrogen adsorption isotherm was obtained under a liquid nitrogen atmosphere (77 K) using a nitrogen adsorption apparatus ("ASAP-2420" manufactured by Micromeritics Co.), and the specific surface area ($m^2/g$) was determined by the BET method.

Analysis by Mercury Intrusion Porosimetry

Properties of the sample were measured by using a mercury porosimeter (Poresizer 9320 manufactured by Micromeritics and Poremaster GT manufactured by Yuasa Isonics) under the condition that the physical properties of mercury were set to a contact angle of 140 degrees, a density of 13.5335 g/cm³, and a surface tension of 480 dyn/cm. The sample was measured in a range of $1.54 \times 10^{-3}$ to 413.4 MPa of mercury intrusion pressure. Based on the result, a Log differential pore volume distribution curve was drawn in a Log differential pore volume distribution diagram having a pore diameter (nm) on a horizontal axis and a pore volume ($cm^3/g$) on a vertical axis. And the pore volume, the area-based median diameter, the peak position, the half band width of the peak in a pore diameter within a range of from 3.6 nm to 5,000 nm (mercury intrusion pressure 0.30 MPa to 413.4 MPa) were measured. Also, the maximum value and the minimum value of the pore volume in the Log differential pore volume distribution diagram in a pore diameter within a range of from 1,000 nm to 5,000 nm (mercury intrusion pressure: 0.30 MPa to 1.46 MPa) were measured. Table 3 shows the results.

Area-Based Median Diameter

Based the measurement results of the above mercury porosimeter, the integrated value of 50% in area-based was defined as the median diameter.

Peak Position, Half Band Width of the Peak

In the Log differential pore volume distribution of the Log differential pore volume distribution diagram having a pore diameter (nm) on a horizontal axis and a pore volume ($cm^3/g$) on a vertical axis drawn based on the measurement results of the mercury porosimeter, the maximum value on the pore diameter distribution curve was set as distribution peak M1 and the pore diameter corresponding to the peak top position of the peak M1 was specified. The peak width at half height of the peak M1 from the peak top to the base line was defined as the half band width (peak M1). If the sample has plurality of peaks, the peak position and the half band width were similarly determined for each peak (peak M2).

Amount of Acidic Surface Functional Groups

The amount of acidic surface functional groups was measured by the Boehm method (the document "H. P. Boehm, Adzan. Catal, 16, 179 (1966)" describes the method in details). In particular, firstly, 50 mL of sodium ethoxide aqueous solution (0.1 mol/L) was added to 1 g of the sample, and the mixture was stirred at 500 rpm for 2 hours, and then left the mixture for 24 hours. Thereafter, the mixture was further stirred for 30 minutes and then separated by filtration. 0.1 mol/L hydrochloric acid was added dropwise to 25 mL of the obtained filtrate, and the volume of hydrochloric acid titer was measured when the pH reached 4.0. As a blank test, 0.1 mol/L hydrochloric acid was added dropwise to 25 mL of the sodium ethoxide aqueous solution (0.1 mol/L), and the volume of hydrochloric acid titer was measured when the pH reached 4.0. Then, the amount of acidic functional groups (meq/g) was calculated by the following equation (2).

[Formula]

$$\text{Amount of acidic surface functional group (meq/g)} = (a-b) \times 0.1/(S \times 25/50) \quad (2)$$

a: titration volume of hydrochloric acid in blank test (mL)
b: titration volume of hydrochloric acid when the sample was reacted (mL)
S: sample mass (g)

Amount of Basic Surface Functional Groups

The amount of basic surface functional groups was determined by back titration of the measurement of acidic surface functional group amount. In particular, 50 mL of hydrochloric acid (0.1 mol/L) was added to 1 g of the sample, and the mixture was stirred at 500 rpm for 2 hours, and then left the mixture for 24 hours. Thereafter, the mixture was further stirred for 30 minutes and then separated by filtration. 0.1 mol/L sodium hydroxide was added dropwise to 25 ml of the obtained filtrate, and the volume of sodium hydroxide titer was measured when the pH reached 8.0.

As a blank test, 0.1 mol/L sodium hydroxide was added dropwise to 25 ml of the hydrochloric acid (0.1 mol/L), and the volume of sodium hydroxide titer was measured when the pH reached 8.0. Then, the amount of the basic surface functional groups (meq/g) was calculated by the following formula (3).

[Formula]

$$\text{Amount of basic surface functional group (meq/g)} = (c-d) \times 0.1/(S \times 25/50) \quad (3)$$

c: titration volume of sodium hydroxide in blank test (mL)
d: titration volume of sodium hydroxide when the sample was reacted (mL)
S: sample mass (g)

Adsorption Test Method for Distribution of Protein (Lysozyme)

Samples of Example 4, Comparative Example 1 and Comparative Example 3 were selected for the test. The sample was crushed in a mortar and shaken for 10 minutes using a rotating and tapping sieve shaker (manufactured by SIEVE FACTORY IIDA Co., Ltd.) with a JIS standard circular sieve (mesh size: 53 μm, 300 μm) to obtain 53 μm to 300 μm particles, and then the particles was dried at 115° C. for 2 hours. The dried sample was packed into a column having an inner diameter of 10 mm φ so that the column packing height became 30 mm. After allowing the sample solvent to flow sufficiently and confirming that the pH and light absorbance of the column inlet and that of the column outlet are equal, a protein solution (chicken egg white lysozyme manufactured by Nacalai Tesque, Inc.) was passed through the column, and the eluate from the column outlet was collected by a fixed amount. About 60 ml of the protein solution was circulated so that the space velocity SV maintains 13 to 14 $h^{-1}$. The solution collected from the column was measured for light absorbance at 280 nm using a spectrophotometer (U-2910, manufactured by Hitachi High-Technologies Corporation) to determine a breakthrough curve. From the breakthrough curve, the protein adsorption amount (10% breakthrough) was determined. Table 4 shows the results.

Vapor Adsorption Test

A vapor adsorption amount measuring device (BEL-SORP-max, manufactured by Microtrap Bell) was used for the test. About 40 mg of the sample was put into a cell, and pretreatment was performed by heating at 250° C. for 5 hours under vacuum, followed by introduction of a replacement gas and then weighing the sample. The measurement of the vapor adsorption amount was performed in a water bath maintained at 25° C. by a circulating thermostat within a relative pressure $(P/P_0)$ of 0.0 to 0.85. The test was performed on Example 4 and Comparative Example 1. FIG. 8 shows the results.

TABLE 1

| raw material No. | name of raw material | primary particle diameter |
|---|---|---|
| raw material 1 | Carbon black (#2650); Mitsubishi Chemical Corporation | 13 nm |
| raw material 2 | Carbon blak (MOGUL); Cabot Corporation | 24 nm |
| raw material 3 | Carbon blak (MONARCH); Cabot Corporation | 13 nm |
| raw material 4 | Carbon black (#10); Mitsubishi Chemical Corporation | 75 nm |
| raw material 5 | Activated Carbon (W10-30 MC Evolve Technologies Corporation | — |

TABLE 2

| No. | Examples | types | raw material | primary particle diameter nm | post-treatment pressure condition | post-treatment heat treatment | nitrogen gas adsorption method BET specific surface area $m^2/g$ |
|---|---|---|---|---|---|---|---|
| Ex. 1 | Example 1 | CB-CIP | raw material 1 | 13 | CIP 20 MPa-5 min | — | 353 |
| Ex. 2 | Example 2 | | | | CIP 50 MPa-5 min | — | 348 |
| Ex. 3 | Example 3 | | | | CIP 100 MPa-5 min | — | 362 |

TABLE 2-continued

| No. | Examples | types | raw material | primary particle diameter nm | post-treatment pressure condition | post-treatment heat treatment | nitrogen gas adsorption method BET specific surface area m²/g |
|---|---|---|---|---|---|---|---|
| Ex. 4 | Example 4 | | | | CIP 200 MPa-5 min | — | 341 |
| Ex. 5 | Example 5 | | | | CIP 200 MPa-5 min | 1200° C. | 304 |
| Ex. 6 | Example 6 | | | | CIP 200 MPa-5 min | 2400° C. | 164 |
| Ex. 7 | Example 7 | | raw material 3 | 13 | CIP 200 MPa-5 min | — | 622 |
| Ex. 8 | Example 8 | | raw material 2 | 24 | CIP 200 MPa-5 min | — | 142 |
| Ex. 9 | Example 9 | | raw material 4 | 75 | CIP 200 MPa-5 min | — | 29 |
| Ex. 10 | Example 10 | | raw material 1, 2 | 19 | CIP 200 MPa-5 min | — | 240 |
| Ex. 11 | Example 11 | | raw material 1, 2 | 19 | CIP 200 MPa-5 min | — | 240 |
| Comp. 1 | Comparative Example 1 | CB | raw material 1 | 13 | non | — | 333 |
| Comp. 2 | Comparative Example 2 | CB-uniaxial press molding | raw material 1 | 13 | uniaxial press 178 MPa-3 min | — | 354 |
| Comp. 3 | Comparative Example 3 | Activated Carbon | raw material 5 | — | non | — | 1121 |

TABLE 3

| | | mercury porosimetry | | | | | | | | | | surface functional group | | |
|---|---|---|---|---|---|---|---|---|---|---|---|---|---|---|
| | | pore volume of from 3 to 5,000 nm cm³/g | area-based median diameter nm | pore size peak M1 nm | pore size peak M2 nm | half band width peak M1 nm | half band width peak M2 nm | half band width/area-based median diameter peak M1 | half band width/area-based median diameter peak M2 | pore volume in Log differential pore volume distribution in pore diameter of from 1,000 to 5,000 nm [1] Maximum value cm³/g | pore volume in Log differential pore volume distribution in pore diameter of from 1,000 to 5,000 nm [2] Minimum value cm³/g | Δ [1]−[2] Difference between maximum value and cm³/g | acidic surface functional groups meq/g | basic surface functional groups meq/g | total functional groups meq/g |
| No. | Examples | | | | | | | | | | | | | | |
| Ex. 1 | Example 1 | 0.52 | 7.3 | 7.1 | — | 2.7 | — | 0.37 | — | 0.01 | 0.00 | 0.01 | 0.61 | 0.00 | 0.61 |
| Ex. 2 | Example 2 | 0.43 | 7.0 | 6.7 | — | 2.7 | — | 0.39 | — | 0.01 | 0.00 | 0.01 | 0.61 | 0.00 | 0.61 |
| Ex. 3 | Example 3 | 0.39 | 7.0 | 6.7 | — | 2.6 | — | 0.37 | — | 0.01 | 0.00 | 0.01 | 0.61 | 0.00 | 0.61 |
| Ex. 4 | Example 4 | 0.33 | 6.5 | 6.4 | — | 2.4 | — | 0.37 | — | 0.01 | 0.01 | 0.00 | 0.61 | 0.00 | 0.61 |
| Ex. 5 | Example 5 | 0.36 | 8.0 | 8.0 | — | 2.5 | — | 0.31 | — | 0.00 | 0.00 | 0.00 | 0.00 | 0.21 | 0.21 |
| Ex. 6 | Example 6 | 0.25 | 8.5 | 8.5 | — | 2.6 | — | 0.30 | — | 0.00 | 0.00 | 0.00 | 0.00 | — | 0.00 |
| Ex. 7 | Example 7 | 0.53 | 5.8 | 5.7 | — | 3.0 | — | 0.52 | — | 0.01 | 0.00 | 0.01 | 1.27 | 0.00 | 1.27 |
| Ex. 8 | Example 8 | 0.47 | 18.4 | 18.6 | — | 6.5 | — | 0.35 | — | 0.02 | 0.00 | 0.01 | 0.51 | 0.00 | 0.51 |
| Ex. 9 | Example 9 | 0.76 | 96.7 | 97.3 | — | 30.8 | — | 0.32 | — | 0.18 | 0.16 | 0.02 | 0.04 | 0.00 | 0.04 |
| Ex. 10 | Example 10 | 0.45 | 8.2 | 7.3 | 19 | 2.8 | 7.4 | 0.38 | 0.40 | 0.04 | 0.01 | 0.03 | 0.56 | 0.00 | 0.56 |
| Ex. 11 | Example 11 | 0.33 | 9.3 | 9.0 | — | 3.9 | — | 0.41 | — | 0.01 | 0.00 | 0.01 | 0.56 | 0.00 | 0.56 |
| Comp. 1 | Comparative Example 1 | 2.30 | 7.4 | 7.1 | 9936 | 2.5 | 401377 | 0.34 | 40.4 | 1.86 | 1.23 | 0.63 | 0.61 | 0.00 | 0.61 |
| Comp. 2 | Comparative Example 2 | 0.70 | 7.0 | 6.7 | 712 | 2.7 | 2445 | 0.38 | 3.43 | 0.26 | 0.07 | 0.19 | 0.61 | 0.00 | 0.61 |
| Comp. 3 | Comparative Example 3 | — | — | — | — | — | — | — | — | — | — | — | 0.13 | 0.39 | 0.52 |

TABLE 4

| Examples | types | raw material | CIP condition (pressure-retention time) | particle size adjusted·X· μm | nitrogen gas absorption method BET specific surface area m²/g | nitrogen gas absorption method pore volume cm³/g | nitrogen gas absorption method average pore diameter nm | surface functional group acidic surface functional groups meq/g | surface functional group basic surface functional groups meq/g | surface functional group total functional groups meq/g | absorption test result for distribution lysozyme (10% breakthrough) mg/cm³ |
|---|---|---|---|---|---|---|---|---|---|---|---|
| Example 4 | CB-CIP | raw material 1 | 200 MPa-5 min | 53~300 | 341 | 0.44 | 5.33 | 0.61 | 0.00 | 0.61 | 7.3 |
| Comparative Example 1 | CB | raw material 1 | — | — | 333 | 0.45 | 0.07 | 0.61 | 0.00 | 0.61 | 2.7 |

TABLE 4-continued

| Examples | types | raw material | CIP condition (pressure-retention time) | particle size adjusted※ μm | nitrogen gas absorption method | | | surface functional group | | | absorption test result for |
|---|---|---|---|---|---|---|---|---|---|---|---|
| | | | | | BET specific surface area m²/g | pore volume cm³/g | average pore diameter nm | acidic surface functional groups meq/g | basic surface functional groups meq/g | total functional groups meq/g | distribution lysozyme (10% breakthrough) mg/cm³ |
| Comparative Example 3 | Activated Carbon | raw material 5 | — | 53~300 | 1106 | 0.52 | 1.47 | 0.13 | 0.39 | 0.52 | 1.0 |

※The particle size adjustment is a classification condition of absorption test for distribution of lysozme.

FIG. 1 shows a Log differential pore volume distribution curve of each sample measured by a nitrogen gas adsorption method. Unlike the mercury intrusion porosimetry, the nitrogen gas adsorption method changes no pore structure by the pressure to the gap during the measurement, and thus the distribution curve reflects the pore structure of the carbon black molded body of the comparative example as it is. Compared with Examples 1 to 4, 8, 10 and 11 conducted the isostatic pressing treatment, Comparative Example 1 without pressure treatment had no peaks and showed non-uniform pore diameter distribution because Comparative Example 1 was prepared without any pressure treatment. The carbon black of Comparative Example 2 was prepared by the uniaxial press molding. This carbon black contains various pore diameters because the carbon black was unevenly compressed from only one direction.

As shown in FIG. 1, the results of Examples 1 to 4, in which only the pressure condition of CIP treatment was changed, indicate that the distribution peak top position tends to appear in the smaller pore diameter direction as the pressure increases during the molding. It is considered from the results that the higher pressure during the molding decreases inter-particle voids to reduce pore diameter formed in the molded body.

FIG. 2 shows the Log differential pore volume distribution curve of each sample measured by the nitrogen gas adsorption method. The results of Examples 4, 8, 10, and 11, in which the isostatic pressing treatment was performed under the same conditions except the raw material, indicate that the peak M of the distribution appeared differently according to the raw material used. On the other hand, Comparative Example 1 without any pressure treatment showed no peak of the distribution because Comparative Example 1 was prepared without pressure molding. These results indicate that a peak of the distribution is formed by isostatic pressing treatment.

FIG. 3 shows the Log differential pore volume distribution curves of the samples of Examples 4 and 7 to 10 measured by the mercury intrusion porosimetry measurement. These samples were prepared by processing the carbon black having different primary particle diameters by the isotropic pressure treatment under the same conditions. FIG. 3 clearly indicates that the inter-particle void tends to form larger void as the primary particle has the larger diameter. FIG. 4 shows the relationship between the area-based median diameter and the primary particle diameter; FIG. 5A shows the relationship between the half band width of the pore diameter distribution and the area-based median diameter; and FIG. 5B shows the relationship between the ratio of [half band width/area-based median diameter] and the area-based median diameter. FIG. 4 indicates that the pore diameter tends to be large as the primary particle has the larger diameter. Also, FIG. 5A indicates that the pore distribution tends to be broad as the area-based median diameter is larger. FIG. 5B indicates that the peak M1 has a narrow half band width regardless of the value of the area-based median diameter which indicates the peak M1 is sharp.

FIGS. 7A and 7B show the Log differential pore volume distribution curves obtained by measuring Examples 4, 8, 10, and 11 by the nitrogen gas adsorption method. As shown in FIGS. 7A and 7B, Example 10 in which two types of carbon black (raw material Nos. 1 and 2) were processed by simple mixing treatment showed two peak tops. Each peak of the Example 10 showed the same position as the peak of Example 4 (raw material No. 1) and the peak of Example 8 (raw material No. 2). That is, the simple mixing reflects the peak of each raw material as it is. On the other hand, the composite treatment disintegrates the aggregates and remixed at the primary particle level to reconstitutes aggregates in Example 11. Therefore, processing several kinds of the raw material with the composite treatment provides the carbon black molded body having a more uniform monodisperse distribution peak, and the composite treatment is effective for controlling pores.

FIG. 8 shows the results of examining the water vapor adsorption amounts of Example 4 and Comparative Example 1. Example 4 had smaller amount of the acidic functional groups than that of Comparative Example 1. FIG. 8 indicates Example 4 was excellent in the water vapor adsorption and Example 4 drastically increases the water vapor adsorption amount within the relative pressure $P/P_0$ of from 0.8 to 0.85.

FIG. 9 shows the results of examining the effect of the heat treatment and the heating temperature. FIG. 9 indicates that the pore diameter tends to be large as the heat treatment of the carbon black molded body employs higher temperatures. Table 3 indicates that the heat treatment decreases the specific surface area and increases area based median diameter, but hardly affects the half band width M1 of the peak. These results showed the inter-particle voids become large as the carbon black particles is shrinked by the heat treatment which resulted in shifting the pore volume distribution curve to the pore diameter larger side. However, it is considered that the half band width of the peak is maintained because the pore structure is maintained.

As shown in FIG. 10, Example 4 showed a higher lysozyme adsorption rate than Comparative Example 1 without the isotropic pressing treatment and Comparative Example 3 which was the activated carbon. The results indicate that processing the carbon black by the isostatic pressing treatment forms pores suitable for lysozyme adsorption to have appropriate pore size distribution for the adsorption of the lysozyme.

The invention claimed is:

1. A carbon black molded body comprising:
   a binder in an amount of less than 10% by mass;
   a peak M of a pore volume existing in a pore diameter within a range of from 3.6 nm to 500 nm in a Log differential pore volume distribution;
   a half band width of the peak M of 10 nm or less;
   a ratio of the half band width/an area-based median diameter of 0.7 or less; and
   a difference between a maximum value and a minimum value of a Log differential pore volume of 0.18 cm$^3$/g or less in a pore diameter within a range of from 1,000 nm to 5,000 nm in the Log differential pore volume distribution when a pore volume exists in a pore diameter within a range of more than 500 nm;
   wherein the Log differential pore volume distribution having a pore diameter (nm) on a horizontal axis and a pore volume (cm$^3$/g) on a vertical axis is obtained by measuring the carbon black molded body in a pore diameter within a range of from 3.6 nm to 5,000 nm of the carbon black molded body by mercury intrusion porosimetry.

2. The carbon black molded body according to claim 1, wherein
   a number of peaks of the pore volume in the Log differential pore volume distribution in a pore diameter within a range of from 3.6 nm to 500 nm is one peak.

3. The carbon black molded body according to claim 1, wherein
   the carbon black molded body has a BET specific surface area of from 10 m$^2$/g to 2,000 m$^2$/g.

4. The carbon black molded body according to claim 1, comprising no binder.

* * * * *